Sept. 26, 1961   E. S. MacPHERSON   3,001,600
REAR WHEEL SUSPENSION FOR MOTOR VEHICLE
Filed June 25, 1956                              4 Sheets-Sheet 1
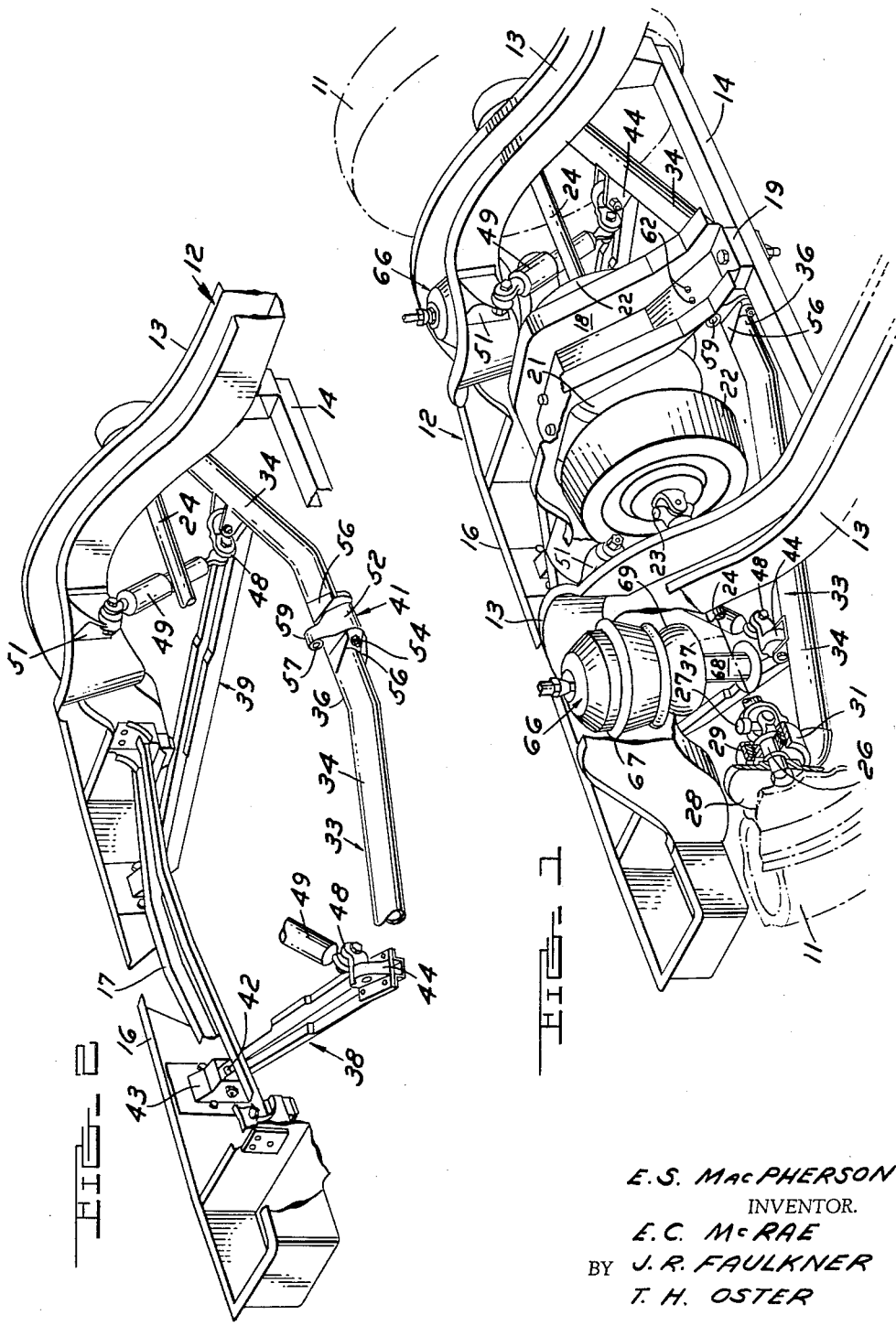
E.S. MacPHERSON
INVENTOR.
E.C. McRAE
BY J.R. FAULKNER
T.H. OSTER
ATTORNEYS

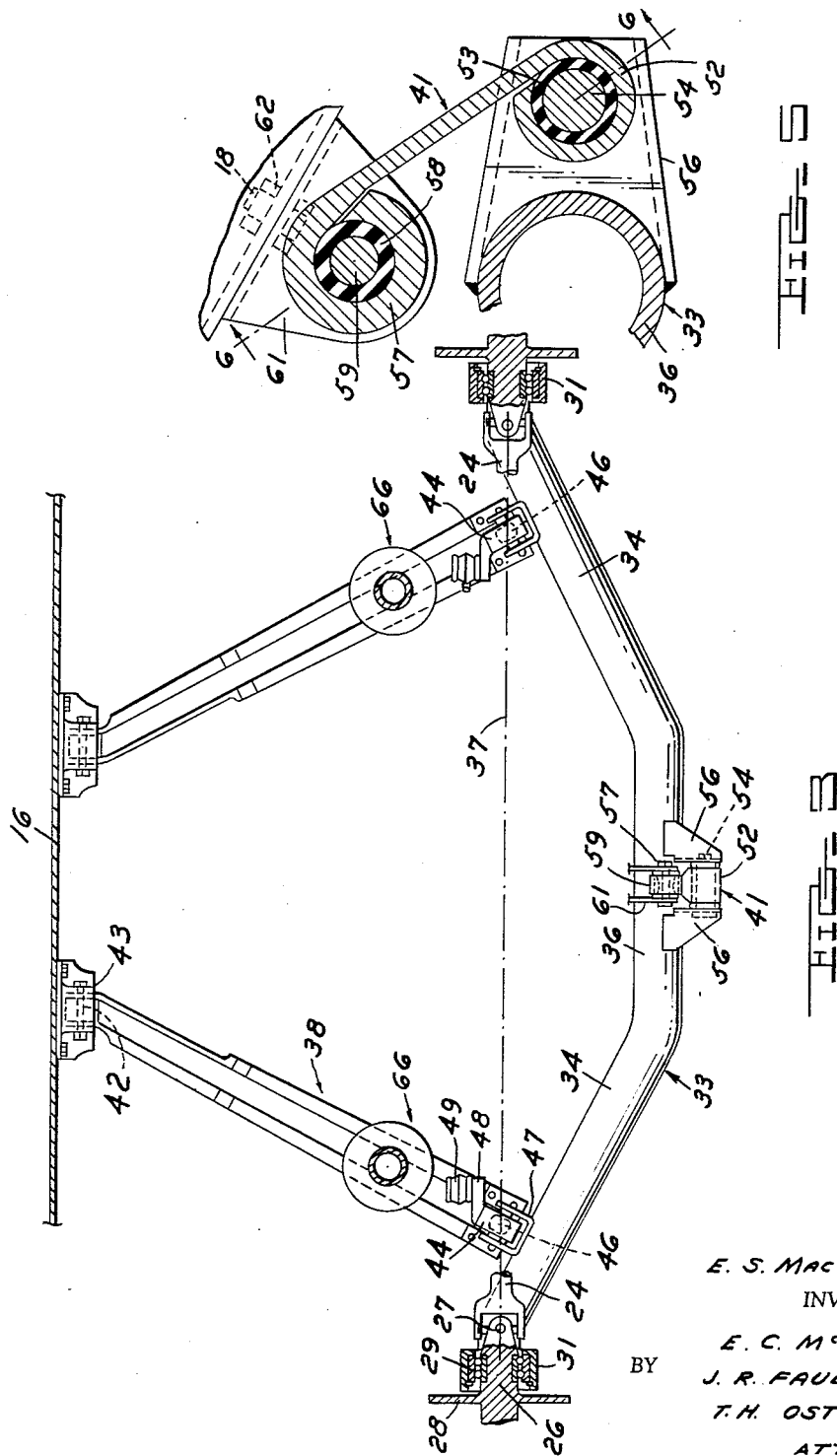

Sept. 26, 1961  E. S. MacPHERSON  3,001,600
REAR WHEEL SUSPENSION FOR MOTOR VEHICLE
Filed June 25, 1956  4 Sheets-Sheet 3
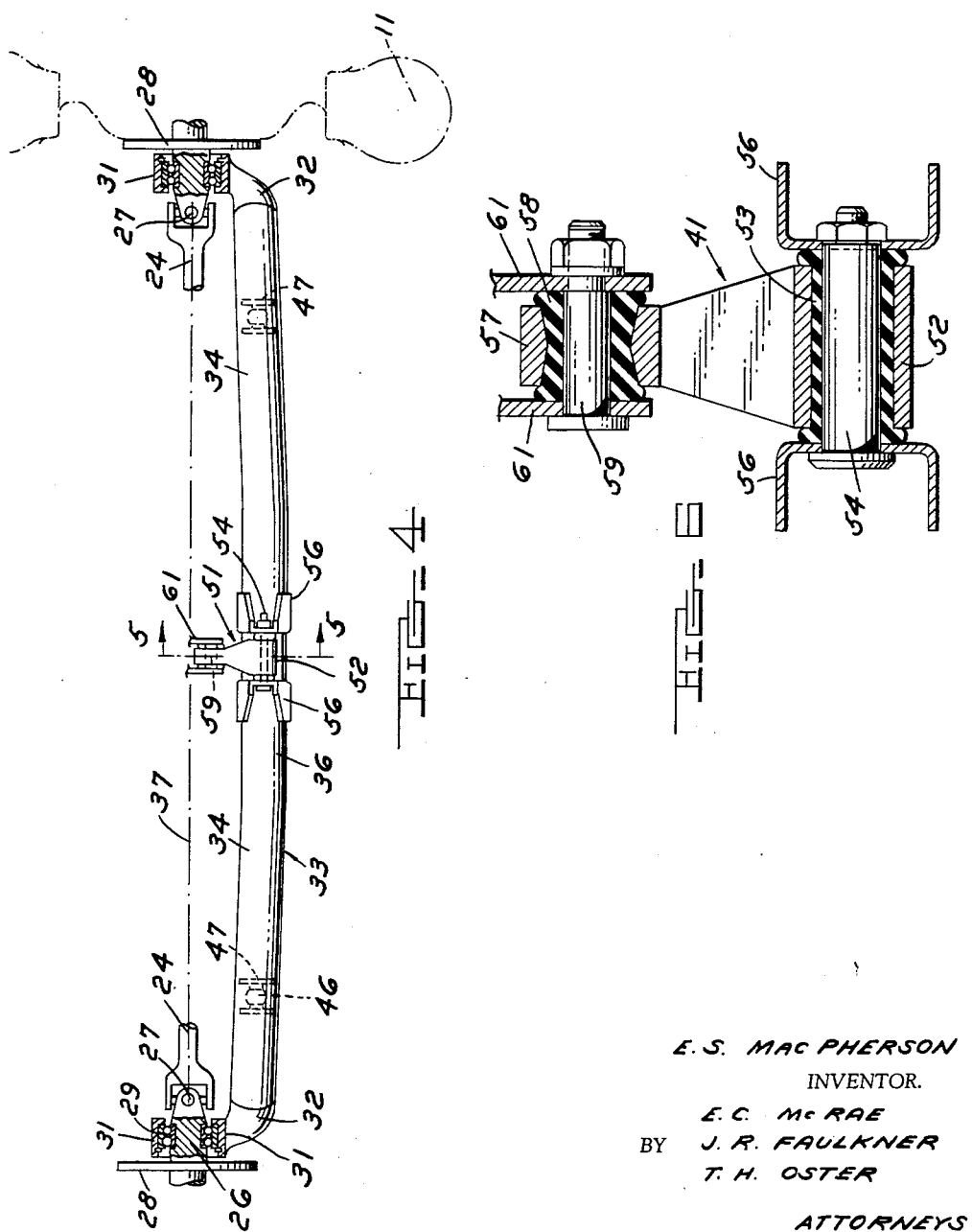
E. S. MACPHERSON
INVENTOR.
BY E. C. McRAE
J. R. FAULKNER
T. H. OSTER
ATTORNEYS

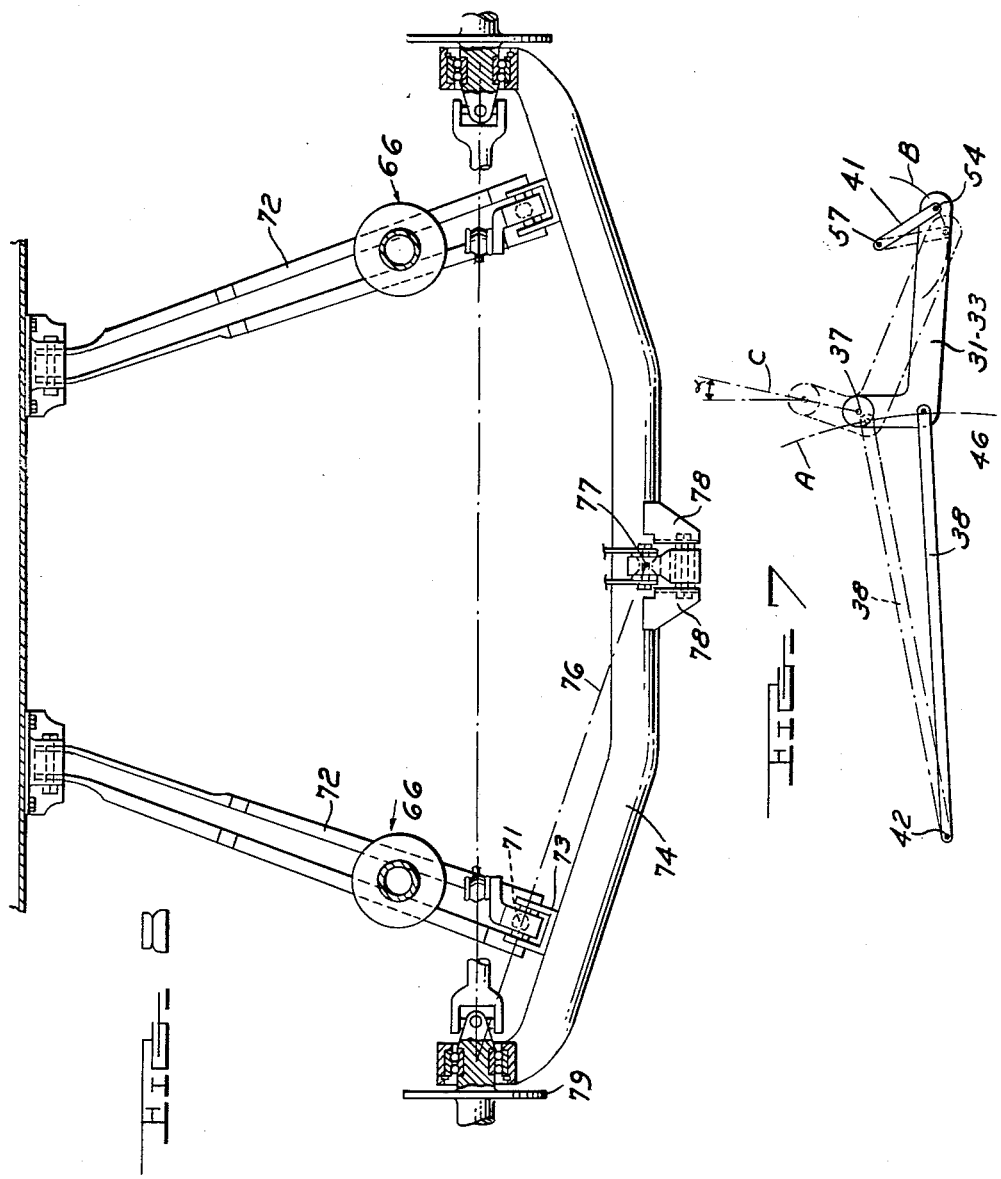

United States Patent Office 3,001,600
Patented Sept. 26, 1961

3,001,600
REAR WHEEL SUSPENSION FOR MOTOR VEHICLE
Earle S. MacPherson, Huntington Woods, Mich., assignor to Ford Motor Company, Dearborn, Mich., a corporation of Delaware
Filed June 25, 1956, Ser. No. 593,490
1 Claim. (Cl. 180—73)

This invention relates generally to motor vehicles, and has particular reference to a rear wheel suspension for a motor vehicle.

An object of the present invention is to provide a rear wheel suspension having desirable characteristics of anti-lift and anti-squat during vehicle braking and acceleration respectively, with such characteristics being effective throughout the entire range of wheel jounce and rebound.

Another object of the present invention is to provide a rear wheel suspension having proper understeer and roll characteristics, while at the same time providing adequate wheel stability and resistance to transverse as well as longitudinal forces upon the wheels.

A further object of the invention is to provide a rear wheel suspension having a minimum of unsprung weight and compactly arranged for economical manufacture and rugged durability.

Other objects and advantages of this invention will be made more apparent as this description proceeds, particularly when considered in connection with the accompanying drawings, wherein:

FIGURE 1 is a perspective view, partially broken away, of the rearward portion of a motor vehicle chassis incorporating the present invention.

FIGURE 2 is a perspective view similar to FIGURE 1 but eliminating certain of the parts thereof to more clearly illustrate other portions of the suspension.

FIGURE 3 is a semidiagrammatic plan view of the suspension shown in FIGURES 1 and 2.

FIGURE 4 is a semidiagrammatic rear elevational view of the structure shown in FIGURE 3.

FIGURES 5 and 6 are enlarged cross sectional views taken on the lines 5—5 of FIGURE 4 and 6—6 of FIGURE 5 respectively.

FIGURE 7 is a diagrammatic side elevational view of the suspension of FIGURES 1 to 6 inclusive.

FIGURE 8 is a semidiagrammatic plan view of a modified construction.

Referring now to the drawings and particularly to FIGURES 1 to 6 inclusive, the invention is shown as applied to a suspension system for the rear road wheels 11 of a motor vehicle having a chassis shown generally at 12. The vehicle may be of the conventional frame type construction, or it may be of the unitary frame-body type, and the term "frame" will be used herein to refer to the structural support of either type of vehicle.

The frame 12 has a pair of longitudinally extending side frame rails 13 interconnected rearwardly of the rear wheels by a cross frame member 14 and also interconnected forwardly of the rear wheels by intermediate cross frame members 16 and 17. An arched longitudinally extending frame member 18 extends between the cross members 14 and 17 and lies substantially along the longitudinal center line of the vehicle. The connections between the center frame member 18 and the cross frame members include resilient mounting members 19, and the frame member has secured thereto and depending therefrom the differential housing 21 containing the usual differential gearing mechanism. Brake assemblies 22 are carried at opposite sides of the differential housing 21 and are connected through universal joints 23 to transversely extending driving shafts 24. The driving shafts 24 are connected adjacent their outer ends to wheel spindles 26 by means of universal joints 27. Wheel flanges 28 are carried on the wheel spindles 26 and in turn support the rear road wheels 11. From the foregoing it will be seen that the differential mechanism and the brake mechanisms for the rear wheels are carried by the vehicle frame, and consequently do not comprise part of the unsprung weight of the suspension.

Each wheel spindle 26 is journaled in wheel bearings 29 carried within a cast wheel hub 31. As best seen in FIGURE 4, each wheel hub 31 is formed with an integral downwardly depending and inwardly curved extension 32 having a sleeved connection with the outer end of an axle tube 33.

The wheel hub extensions 32 and the ends of the axle tube 33 are rigidly secured together to form a unit. The opposite side portions 34 of the axle tube are inclined rearwardly and are joined by a central transversely extending portion 36. This configuration, and the method of attaching the axle tube to the wheel hubs 31 by means of the downwardly depending extensions 32, results in locating the axle tube 33 beneath the wheel axis 37 and rearwardly thereof, so as to provide clearance for the differential housing 21 and brake mechanisms 22, and to place the central portion 36 of the axle tube adjacent the cross frame member 14.

The axle tube 33 is coupled to the vehicle frame in such manner as to provide a predetermined control of its movement in jounce and rebound wheel movements, as well as during roll. The tube mounting includes a pair of trailing arms 38 and 39 at opposite sides of the vehicle, and a centrally located link 41.

The trailing arms 38 and 39 are similar in construction, being symmetrically arranged on opposite sides of the longitudinal center line of the vehicle, and only one will therefore be described in detail. The arm 38 is generally channel shaped in cross section and at its forward end is pivotally connected by means of a pivot pin 42 to a mounting bracket 43 secured to the cross frame member 16. The frame brackets 43 are each located intermediate the side frame rails 13 and the longitudinal center line of the vehicle, and the trailing arms 38 and 39 diverge rearwardly therefrom. The pivot pins 42 connecting the trailing arms to the frame brackets are in alignment with each other along a horizontal transversely extending axis.

Adjacent its rearward end, the channel shaped trailing arm 38 supports a bearing bracket 44. The bracket 44 in turn supports a spherical socket for a pin type ball joint member 46 carried by a U-shaped bracket 47 welded to the rearwardly inclined portion 34 of the axle tube 33. A universal pivotal connection is thus provided between the rearward end of the trailing arm 38 and the axle tube 33. This universal connection, as shown in FIGURE 3, lies in a vertical plane through the wheel axis 37, but some distance below this axis, as best seen in FIGURE 4. It will also be seen that the universal connection 46 is adjacent the outer end of the axle tube, relatively near the wheel spindle 26 and universal joint 27.

The bearing bracket 44 is formed with an inwardly extending flange 48 supporting the lower end of a tubular type shock absorber 49, the latter being inclined inwardly therefrom for pivotal connection to a frame bracket 51 secured to the inner side of the side frame rail 13.

Referring now particularly to FIGURES 2, 5 and 6, the connection between the frame and the central portion of the axle tube 33 comprises a short link 41. The ling 41 is formed with an eye 52 surrounding a rubber bushing 53 sleeved upon a pivot pin 54 extending between channel shaped brackets 56 welded to and extending rearwardly from the transversely extending central portion 36 of the axle tube 33. The link 41 extends in an inclined direction forwardly and upwardly from its pivotal connection to the pin 54 and at its upper end is formed with an eye 57 encircling a rubber bushing 58 sleeved upon a pivot pin 59 extending between the side flanges 61 of a bracket secured to the underside of the longitudinally extending center frame member 18 by means of bolts 62.

From the foregoing it will be seen that the link 41 mounts the axle tube 33 for pivotal movement about the horizontal extending axis of the pivot pin 59 carried on the vehicle frame. The movement of course is in an arc having a radius equal to the distance between the axes of the pivot pins 59 and 54.

The link 41 is also arranged to permit rocking movement of the axle tube 33 about a longitudinally extending axis to accommodate vehicle roll. This could, of course, be accomplished by providing a ball joint or other universal connection between the ling 41 and the frame, but in the present instance this is accomplished by providing a rubber bushing 58 of such design as to permit the necessary roll movement. As seen in FIGURE 6, the rubber bushing 58 surrounding the pivot pin 59 has a thick wall, and is formed of relatively soft rubber or other resilient material. In addition, the outer periphery of the bushing 58 is V-shaped in cross section and engages a correspondingly shaped aperture in the eye 57 of the link 41. The resulting construction is such that rocking movement of the axle tube 33 about a longitudinally extending axis through the upper eye 57 of the link 41 is adequately accommodated by the bushing 58 so as to permit vehicle roll.

It will be seen that the pivotal connection 59 between the link 41 and the frame member 18 is located vertically above the central portion 36 of the axle tube 33, while at the same time being preferably located beneath the horizontal plane through the wheel axis 37.

Any desired spring means may be used in connection with this suspension, but in the present instance the spring means employed comprises an air spring 66 having upper and lower telescopic sections 67 and 68 connected respectively to the side frame rail 13 and the trailing arm 38 and interconnected by a diaphragm 69 to vary the volume of air therebetween as the vehicle wheels rise and fall. If desired, other spring means such as coil springs may be used in lieu of the air spring shown.

A diagrammatic drawing illustrating the movement of the suspension during jounce and rebound is shown in FIGURE 7, in which the rigidily interconnected wheel hubs 31 and axle tube 33 are shown in side elevation as an L-shaped member 31—33. The member 31—33 has a universal connection 46 to the rearward end of the trailing arm 38, a pivotal connection 37 to the road wheel, and a pivotal connection 54 to the lower end of the link 41. The link 41 is pivotally connected at 57 to the vehicle frame. It will be noted that during jounce, in which the road wheel having its axis at 37 moves upwardly with respect to the vehicle frame, the universal connection 46 between the rearward end of the trailing arm 38 and the axle tube 33 moves upwardly along an arc A whose center is the horizontal transverse axis 42 forming the pivotal connection between the trailing arm 38 and the vehicle frame. Since the trailing arm 38 is inclined downwardly in a forward direction in its normal position it will be seen that the joint 46 moves rather rapidly forwardly during jounce. At the same time, the pivotal connection 54 between the lower end of the link 41 and the center portion of the axle tube 33 swings in an arcuate path B about the pivotal connection 57 of the link with the frame. With this arrangement, the trailing arm 38 and the link 41 control the rigid wheel hub and axle tube 31—33 in such manner as to move the wheel axis 37 outwardly along an inclined path C. One position of wheel jounce is shown in dotted lines, and it will be seen that the wheel axis path C during jounce is in an upward and rearward direction forming at any point an angle alpha with a vertical line through the wheel axis. During vehicle acceleration, this provides an upwardly directed anti-squat force equal to the acceleration force applied to the wheels times the tangent of the angle alpha.

During wheel rebound the trailing arm 38 and the link 41 control the wheel movement in such manner as to cause the wheel axis 37 to move downwardly along the path C in a downward and forwardly inclined direction. The deceleration force upon the wheels due to braking results in an anti-lift force upon the vehicle frame, which is in the form of a downward force on the center link 41 of the axle tube 33. This downward force counteracts the tendency of the rearward portion of the vehicle chassis to lift during braking.

In some rear suspensions a measure of anti-lift and anti-squat control is provided, but the control is not uniform for the complete range of acceleration and deceleration forces, and often results in the improper amount of anti-lift or anti-squat force required to properly counteract the tendency of the rearward portion of the vehicle chassis to lift or squat. In some suspensions, for example, the path C may be a sharply curved path formed generally about an axis located downwardly and rearwardly from the wheel axis, and may even result in a complete loss of anti-lift force during extreme rebound movements. With the suspension geometry of the present construction, however, the path C may assume a path approximating a straight line so as to secure proper anti-lift and anti-squat forces throughout the entire jounce and rebound range of wheel movement.

During vehicle roll, rocking of the axle tube 33 is permitted about a longitudinally extending axis through the center link 41, and this movement, together with the control provided by the trailing arms 38 and 39, results in controlled paths of movement for axes of the road wheels. The control is such that during a vehicle turn the rear wheel at the outer side of the turn moves forwardly providing desired understeer for proper vehicle handling characteristics.

FIGURE 8 illustrates a modification of the invention in which the universal connection 71 between the rearward end of the trailing arm 72 and a bracket 73 carried by the axle tube 74 lies in a vertical plane 76 passing through the pivotal connection 77 between the center link 78 and the vehicle frame and the center line of the road wheel 79. This places the universal connection 71 rearwardly of the wheel axis 72 and results in a suspension in which the roll rate equals the jounce rate. As long as the universal joint 71 lies in the plane 76 the two rates will be approximately equal and desirable riding characteristics are obtained which may be superior to the usual arrangement in which the jounce rate is considerably higher than the roll rate.

It will be understood that the invention is not to be limited to the exact construction shown and described, but that various changes and modifications may be made without departing from the spirit and scope of the invention, as defined in the appended claim.

What is claimed is:

A wheel suspension for a motor vehicle comprising a vehicle frame, a pair of road wheels on opposite sides of said frame, transversely extending driving means for said road wheels, a rigid transversely extending axle rearwardly of said driving means and interconnecting said wheels, a pair of generally longitudinally extending suspension arms each pivotally connected at one end to said frame and at the opposite end to said axle adjacent the outer ends of the latter, and a relatively short link having its opposite ends pivotally connected directly to said frame and to said axle adjacent the transverse midpoint of the axle, said link lying generally in a vertical plane through the longitudinal center-line of the vehicle, the pivotal connections between said suspension arms and said axle lying substantially in a vertical plane containing the common axis of said road wheels and being spaced equal distances beneath said axis.

References Cited in the file of this patent

UNITED STATES PATENTS

| | | |
|---|---|---|
| 2,074,289 | Wagner | Mar. 16, 1937 |
| 2,369,501 | Wagner | Feb. 13, 1945 |
| 2,756,835 | Muller | July 31, 1956 |

FOREIGN PATENTS

| | | |
|---|---|---|
| 765,682 | Germany | June 22, 1953 |